United States Patent [19]
Kropp

[11] Patent Number: 5,012,110
[45] Date of Patent: Apr. 30, 1991

[54] SUBSTRATE AND PROCESS AND APPARATUS FOR THE PRODUCTION THEREFOR

[76] Inventor: Konrad E. W. Kropp, Via Storta 78, CH-6645 Brione S/M, Switzerland

[21] Appl. No.: 388,778

[22] Filed: Aug. 1, 1989

Related U.S. Application Data

[63] Continuation-in-part of Ser. No. 37,752, Apr. 13, 1987, abandoned.

[30] Foreign Application Priority Data

Apr. 11, 1986 [DE] Fed. Rep. of Germany ....... 3612315

[51] Int. Cl.$^5$ ............................................. H01J 37/00
[52] U.S. Cl. .................................. 250/492.1; 148/108
[58] Field of Search ............. 250/492.1, 423 R, 423 P; 148/100, 103, 108; 33/DIG. 1

[56] References Cited

U.S. PATENT DOCUMENTS

| | | | |
|---|---|---|---|
| 3,409,479 | 11/1968 | Greenberg et al. | 148/108 |
| 3,893,768 | 7/1975 | Stephens et al. | 313/161 |
| 4,003,768 | 1/1977 | Anderson et al. | 148/108 |
| 4,044,252 | 8/1977 | Rentzepis | 250/423 P |
| 4,059,463 | 11/1972 | Aonuma et al. | 148/108 |
| 4,085,332 | 4/1978 | Wilhelm | 250/423 P |
| 4,096,316 | 6/1970 | Tamai et al. | 148/108 |
| 4,272,681 | 6/1981 | Fill et al. | 250/281 |
| 4,437,908 | 3/1984 | Inoue | 148/108 |
| 4,458,148 | 7/1984 | Hirshfield et al. | 250/423 P |
| 4,649,273 | 3/1977 | Chutjian et al. | 250/423 P |
| 4,739,169 | 4/1988 | Kurosawa et al. | 250/423 R |

OTHER PUBLICATIONS

"Is Homoeopathy a Placebo Response?", Lancet, Oct. 18, 1986, David T. Reilly et al., pp. 881–886.
"Control of Stillbirths in Pigs Using Homeopathy", Journal of the American Institute of Homeopathy, C.E.I. Day, Dec. 1986 79 (4), pp. 146–147.
"Human Basophil Degranulation Triggered by Very Dilute Antiserum Against IgE.", E. Davenas et al., Nature vol. 333, Jun. 30, 1988.
"Berechnung elektrischer Felder in biologischen Geweben auf der Basis von klassifizierten NMR-Bilddaten", U. Stilla et al., Biomedizinische Technik Band 32, heft 11/1987.
"Vorzuge Der Magneti-Schenwasser-Behandlung", Dr. Klaus J. Kronenberg, Raum & Zeit, pp. 53–62.
"Stereoelectronic Effects in Biomolecules", David G. Gorenstein, Chemical Rev. 1987, 87, pp. 1047–1077.
Advertisement–"The Natec Water-Conditioner", (Summary and Technical Description), 15 pages.

Primary Examiner—Bruce C. Anderson
Attorney, Agent, or Firm—Kirkpatrick & Lockhart

[57] ABSTRACT

A process and an apparatus for performing the process are provided wherein a synthetic homeopathic substrate is manufactured by placing a substrate between two magnets and feeding information energy, such as electromagnetic energy in a frequency range of an amount up to about twelve KHz, to the substrate along a path transverse to the connection axis between the two magnets. The treated substrate is useful in a variety of areas.

21 Claims, 5 Drawing Sheets

SUBSTRATE AND PROCESS AND APPARATUS FOR THE PRODUCTION THEREFOR

This application is a continuation-in-part of co-pending application Ser. No. 037,752 filed Apr. 13, 1987, now abandoned.

BACKGROUND OF THE INVENTION

1. Field of the Invention

The present invention relates to the field of magneto-chemistry, and more particularly, to a process and apparatus for synthesizing a magnetically altered substrate which will exhibit, upon use, a homeopathic effect.

2. Description of the Prior Art

Homeopathic medicine works on the principal that very small concentrations of appropriate products may have consequences that far outweigh those expected of them. In an article published in *The Lancet* in 1986, the authors reported that hay fever patients treated with a homeopathic preparation of mixed grass pollens showed a significant reduction in symptoms as compared to patients treated with a placebo. "Is Homeopathy A Placebo Response?, Controlled Trial of Homeopathic Potency, with Pollen In Hay Fever as Model," *The Lancet*, Oct. 18, 1986. A less rigorous study reported in "Control of Stillbirths In Pigs Using Homeopathy," *Journal of the American Institute of Homeopathy*, 79(4) 146-147 (Dec. 1986) showed a reduction in the number of stillbirths in pigs treated with the homeopathic remedy, caulophyllum.

Aqueous solutions of an antibody were reported to retain the ability to evoke biological responses, even when the solutions were diluted to such an extent that there was a negligible chance of there being a single molecule of antibody in any sample. E. Davenas, et al., "Human basophil degranulation triggered by very diluted antiserum against IgE," 33 *Nature* 816 (Jun. 30, 1988).

Magnetic fields have been used to treat water. Reports have been published, principally in Eastern Europe and The People's Republic of China, which describe observations of advantages obtained from the use of magnetically treated water. Some advantages claimed include reduced formation of boiler scale, dissolution of old lime deposits, accelerated plant growth, desalination of soils, improvement in the quality of cement, improvement in the taste and smell of drinking water, and favorable effects on patients with kidney stones. In addition, changes in the viscosity, IR absorption and surface tension of the water have been reported. See K. Kronenberg, "Advantages of Magnetic Water Treatment," Raume & Zeit, No. 33, p. 53 (1988).

Like the effects reported in homeopathy, the effects reported for magnetically treated water defy scientific explanation. Homeopathy is sometimes explained as copying information, e.g., a pattern or a combination of oscillations of different frequencies, onto a substrate from the information or pattern existing in the molecular structure of natural substances, e.g., herbs, antibodies, or pollen. The substrate with the copied information or pattern incorporated therein can then be used to effect a desired response. For example, in homeopathic medicine, the desired response might be the reduction of allergy symptoms in hay fever sufferers mentioned in the report cited above.

It is known that electrical fields are associated with biological tissue. See, for example, U. Still, et al., "Computation of Electric Fields in Biological Tissue on the Basis of Classified NMR Images," *Biomedizinische Technik*, Vol. 32, No. 11, 1987, pp. 288-292 and D. Gorenstein, "Stereoelectronic Effects in Biomolecules," *Chemical Review*, 1987, Vol. 87, No. 5, pp. 1047-1077.

One explanation of the effects of magnetically treated water is that the application of the treated water to biological tissue or some other substance, such as soil, cement or boilers as mentioned above, alters the electronic field of the substance sufficiently to alter the behavior of the properties of that substance and thereby obtain a desired result.

An object of the present invention is to provide an apparatus and a method for using such apparatus which will synthetically produce a homeopathic substrate. In other words, the object of the present invention is to provide an apparatus and method which introduce synthetic oscillations of differing frequencies (information energy) into a substrate which can then be used, depending on the nature of the substrate and the oscillations transmitted thereto, to elicit a desired result.

Another object of the present invention is the production of a substrate which is based on various substances and which, by virtue of modifications of its internal structural properties or transformation of certain active forces onto said substrate, has particular energy properties for various uses, for example, in the biological field.

SUMMARY OF THE INVENTION

The invention is, to some extent, related to homoeopathy. Whereas natural homoeopathy is explained as the use of a pattern of a combination of oscillations of different frequencies being copied from the pattern existing in the molecular structure of natural herbs, the invention introduces such oscillations into the substrate (mainly pharmaceutically acceptable carriers such as natural saline or massage oil) to produce a substrate with synthezised oscillation patterns. Although such synthezised oscillation patterns have an energy level in the order of that of homoeopathy, the energy level transmitted by the individual oscillation frequencies can be artifically varied, while a homoeopathic oscillation pattern (as a combination of serveral biologically frequent frequencies) are more or less fixed and can only be changed by mixing many kinds of homoeopathic substrates together.

The "synthezised homoeopathy" can be a mixture of different frequencies and specifically, the amplification of special frequencies in the mixtures. Such amplification of special frequencies is expected to be beyond the "traditional" natural frequency mixture or amplification of specific frequencies thereof and is surprisingly harmful to biological agitators and other agents.

The invention at the present time shows the most effective promise in healing biological structures, which includes destroying biological agitators. The synthezised homoeopathy according to the invention can make use of other substrates besides oil and water.

The present invention also provides a method for producing a physical loading or a magnetically spin-based configuration pattern on a very small, but very effective, energy level. Broadly, the method of the present invention is defined as a method to make use of the deviations in the consistency of a substrate when exposed to, or treated in, a magnetic field for applying additional information energy of specifically defined frequencies on the substrate.

A preferred process according to the present invention for the production of a synthetic homeopathic substrate provides that the substrate is disposed between two magnets and information energy, in particular electromagnetic energy, is imparted to the substrate transversely, and preferably perpendicularly, with respect to the axis between the two magnets.

The information energy may be imparted to the substrate in various configurations of the magnetic field, including in regard to its orientation with respect to the magnetic field of the earth, with frequencies which differ according to the desired character of the transformed properties, in a substantially unlimited frequency range, and more particularly, by a coupling effect by way of electrically conductive or non-conductive materials, including semiconductors or semiconductor amplifiers.

In that connection, firstly an intermediate carrier, for example, a small iron plate, may be subjected to the action of the active charge or information energy, and is then subsequently used for further transfer to the substrate which is actually to be treated.

When the substrate, which has been energy-treated in accordance with the invention, is used, the substrate then provides for transformation of the substances or materials which are to be influenced in respect of the properties and developments thereof.

For the purposes of carrying out the process according to the invention, an apparatus has been found to be suitable wherein there are provided two magnets which are spaced from each other and which are arranged with preferably unlike poles in mutually oppositely disposed relationship to each other, and whose magnetic, longitudinal axes are oriented in the same direction. The substrate is arranged between the magnets, preferably midway between the magnets, and electromagnetic energy and/or a so-called active charge or information energy is imparted to the substrate transversely with respect thereto, preferably perpendicularly to the direction of the magnets' longitudinal axes and to the incidence of radiation.

Permanent magnets or electromagnets may be used in that connection. In addition, the apparatus may also be equipped to provide a magnetic field oscillation. If the magnetic field poles are arranged in respectively different orientations relative to each other, it is possible to achieve various substrate properties. The substrates can then be applied for various end uses. The potential uses of the substrates treated according to the invention are manifold.

In experimental operations with liquids, a certain modification in the property of substrates was surprisingly detected, namely that the absorption properties of the liquids are modified. It is believed that information energy, and in particular, electromagnetic information, is impressed on the liquid substrate placed in a magnetic field of appropriate strength and oriented in a given fashion. The modifications in the absorption properties are retained even after elimination of the magnetic field and the information energy source. There is thus shown to be a storage capacity in the modified substrates for the transferred active force or information energy.

It has surprisingly been found that a substrate according to the present invention, which has an energy active charge, and in particular an active charge which is transferred to its material structure, can be detected spectrophotometrically in a modified absorption property, in relation to an active, charge-free, identical substrate. The modified substrate having the transferred active charge can influence other substances which are brought into relationship therewith.

In that connection a detectable interaction or communication occurs between the modified substrate according to the invention and the other substances, and that effect may be used, for example, in the biological field (agriculture or in animal and plant procedures), but also generally as an energy interaction between various materials wherein the materials may occur in different aggregate forms or atomic and molecular structural forms, including in relation to crystalline or reciprocal transfer or communication of energy forces. There is a detectable modification of the substance properties and the active forces of the substances or materials involved.

The modifications in active force or corresponding modifications of properties in respect of the substrate according to the invention may be permanent and may also be inherent in the substrate in oscillating form.

BRIEF DESCRIPTION OF THE DRAWINGS

The present invention can be better understood by reference to the drawings in which.

DETAILED DESCRIPTION OF THE PREFERRED EMBODIMENTS

Various embodiments of the apparatuses of the present invention are illustrated in FIGS. 1, 4, 5 and 6.

Figure 1:
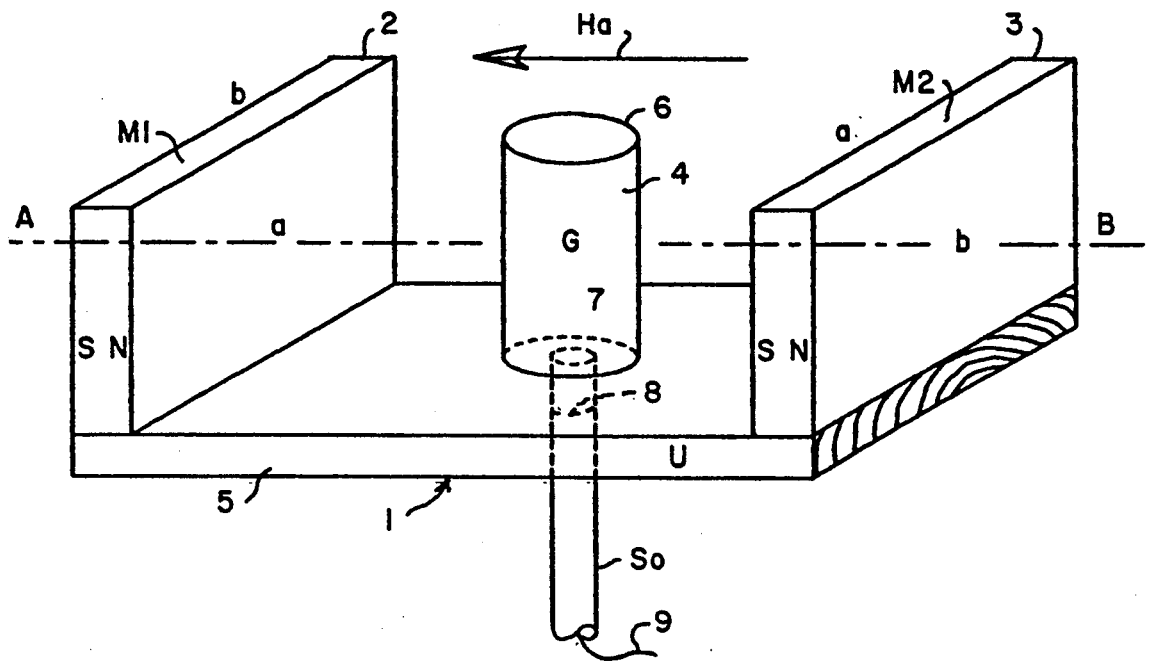
FIG. 1 is a diagrammatic perspective view of an apparatus according to the invention.

The basic arrangement for the treatment of liquids as substrates with a variation in the absorption properties thereof in a magnetic field is shown in FIG. 1. The magnetic field strength Ha is produced by permanent magnets 2 and 3 which are disposed in mutually opposite relationships in an opposite-pole configuration, on non-magnetic support 5. Disposed approximately in the middle of the arrangement is a glass vessel 6 with a substrate 4 to be treated, in the form of a liquid. The respectively selected information energy is supplied to the liquid in the glass vessel 6, perpendicularly to the orientation of the magnetic field Ha, by way of a probe So or 8, 7. In that connection, the glass vessel 6 may also be closed.

The magnetic longitudinal axes A and B of the two permanent magnets 2 and 3 are oriented in the same direction relative to each other. The probe So may be brought in either beside the substrate 4 or the vessel thereof (FIG. 1; 8) or through the non-magnetic support 5 to the substrate, from below (FIG. 1; 7). The information energy is supplied to the probe So by way of the connection 9.

However, the supply of information energy does not necessarily need to be perpendicular to the magnetic field Ha and instead of by way of a probe, may also take place by way of mirrors or reflectors, in particular, parabolic reflectors, or also parabolic antennae, and can thus be supplied to the substrate in a directed manner from different sides within the magnetic field. The probe So may also be arranged in a semi-annular configuration or a horseshoe-like configuration around the outside surface of the vessel 6, for example, in a similar manner to a tongs assembly. With certain forms of energy, it is even sufficient to use a cord-like antenna for supplying the information energy, which either extends into the substrate or can be arranged beside the substrate.

The information energy used may be sound, electromagnetic laser beams or light energy. Additional oscillations may also be pulsed thereon. For that purpose non-electromagnetic energy may be used, such as particle radiation or some other type of radiation.

It was found that the action of the magnetic field strength on the modification in the absorption properties of the substrate is changed if, in the arrangement shown in FIG. 1, the magnets 2 and 3 are interchanged with each other in parallel relationship, without altering the position of their poles. In that case, instead of the poles a, a (as shown in FIG. 1), the poles b, b are therefore disposed in opposite relationship.

As the magnets 2 and 3 are of the same form, comprise the same material and also have the same permanence, the same magnetic field strength is admittedly produced in numerical terms and in respect of polarity, with the same spacing between the mutually oppositely disposed and parallel pole surfaces; but the effect on the absorption properties of the substrate is different.

Figure 2:
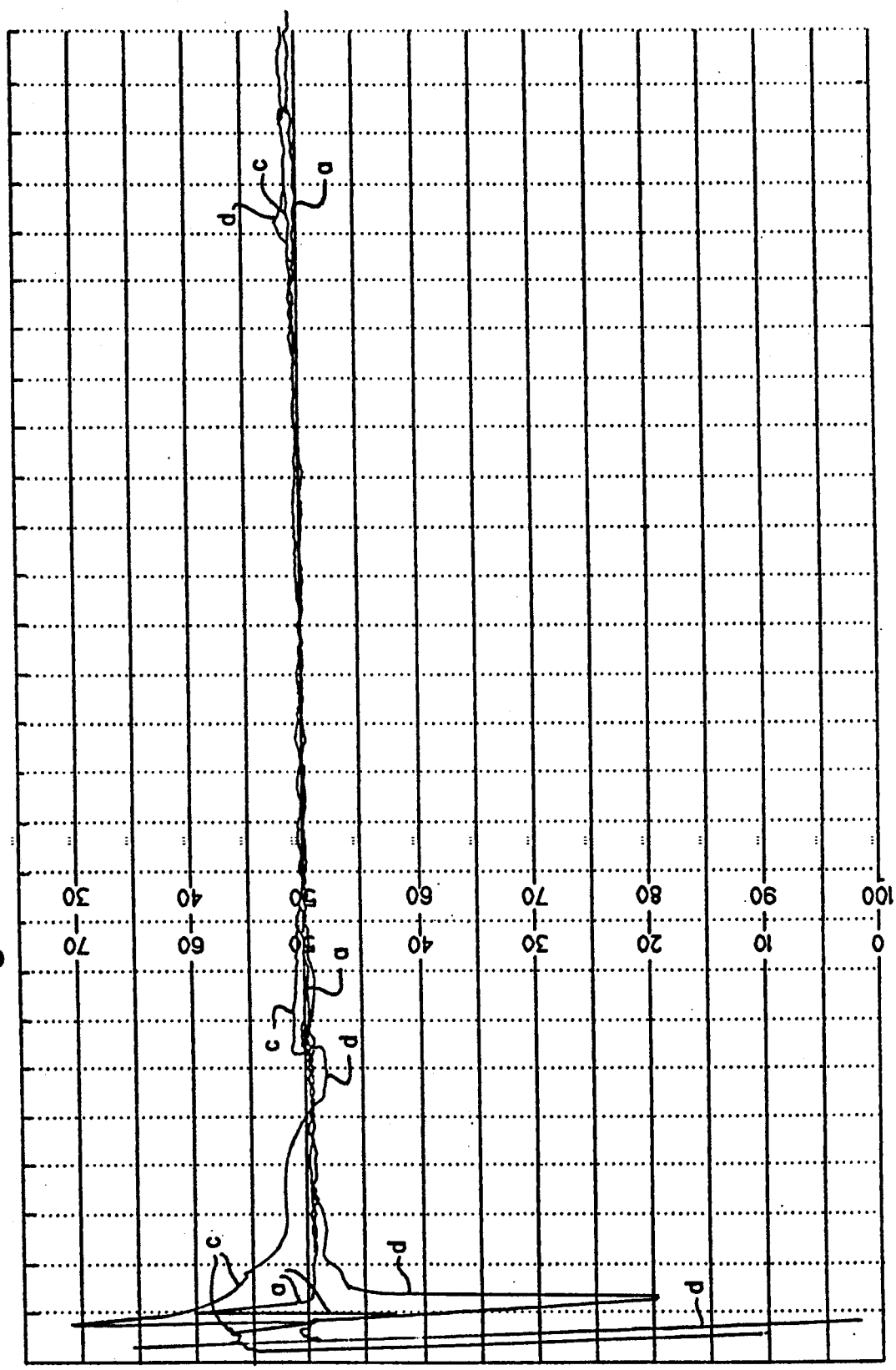
FIG. 2 is a line recorder recording of a photometric absorption measuring device without the supply of information energy by way of the probe shown in FIG. 1 to a given substrate and spectrum lines with a magnetic field of different directions for a substrate treated with information energy.

FIG. 2 shows the absorption spectra which were obtained with a 0.9% common salt solution as the substrate, wherein the curve a, as a base curve, shows the spectrum in the basic position of the magnets 2 and 3, as illustrated in FIG. 1, with the corresponding magnetic field strength Ha, for the liquid, as the substrate, which was in a "virgin" condition originally prior to being introduced into the glass vessel. In that measuring operation, no energy information was imparted to the common salt solution by way of the probe So.

The curves have the following comparative significances:

Curve a: a base line curve is produced when the same "virgin" 0.9% common salt solution is disposed in the rear and in the front cuvettes of the twin-beam spectrophotometer Lambda 3 from Perkin-Elmer. 100 mm Hellma cuvettes were used as the cuvettes in all measuring operations.

Curve c: a "virgin" 0.9% common salt solution is disposed in the rear cuvette, while the front cuvette contains the same solution after it has been treated with energy information by way of the probe So in the arrangement shown in FIG. 1, in a magnetic field of field strength Ha.

Curve d: the rear cuvette contains a "virgin" 0.9% common salt solution after it was treated in the arrangement shown in FIG. 1 in a magnetic field with the field strength Hb, that is to say, with magnets interchanged in parallel relationship.

In the measurements shown in FIG. 2, the speed of registration of the recorder was 60 nm per minute, the ordinate range was plus 0.1 to minus 0.1, the recorded wavelength range extended from 190 nm to 900 nm, and the scale division of the abscissa was 20 nm/cm with the upper limit at 190 nm.

The difference in respect of the absorption curves, that is to say, both in respect of the curves c and d relative to each other and also in comparison with the base line curve a is so striking that the physical effect achieved is evident. In accordance with the known physical laws, with the same applied magnetic field strength, a difference in the two absorption curves could probably really scarcely occur. That is considered to constitute proof of a given physical active force of bipolar nature, which is capable of modifying the molecular or crystal structure of matter or substances and thereby, at least in regard to transparent solid bodies and liquids, influencing the absorption properties thereof by modifying the magnetic quadrapoles.

The physical active force can also be transferred by electrically non-conductive media. There is evidence that that force and the organizational or orientational patterns contained therein is crucially involved in all biological processes. Corresponding test results point positively thereto.

Figure 3:
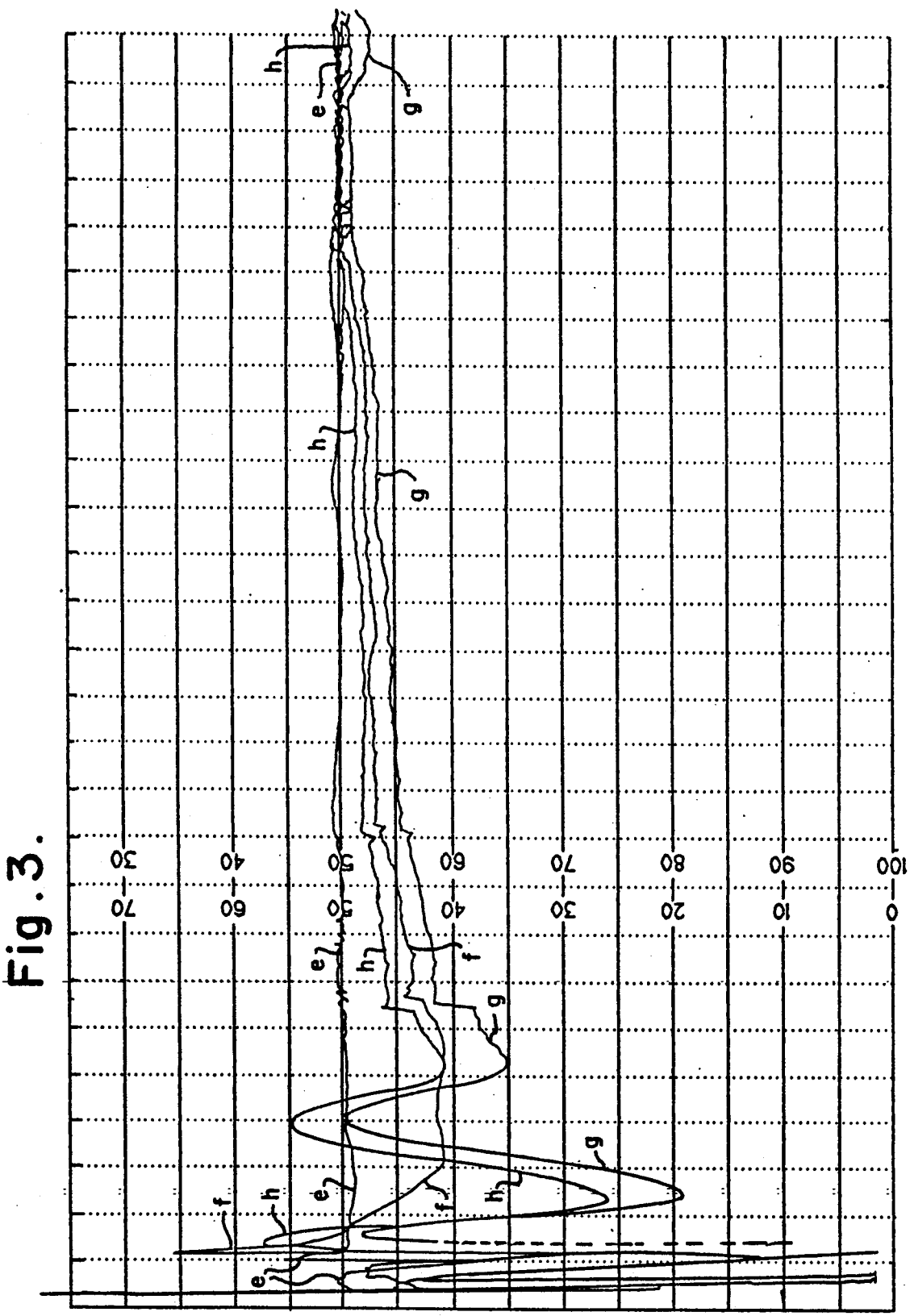
FIG. 3 is a line recorder recording of a photometric absorption measuring device after treatment of a given substrate in a magnetic field by means of a supply of information or active energy of various frequencies by means of the probe shown in FIG. 1.

FIG. 3 records the result of investigations which were carried out with a 0.9% common salt solution to which, for example, electromagnetic information was imparted in the audible sound and ultrasound ranges, in a magnetic field, when using in each case original "virgin" samples.

The curves have the following significances:

Curve e: a base line curve is produced when the same "virgin" 0.9% common salt solution is contained both in the rear and in the front cuvettes of the twin-beam spectrophotometer Lambda 3 from Perkin-Elmer.

Curve f: the rear cuvette contains a "virgin" 0.9% common salt solution while the front cuvette contains the same solution after it has received energy information in the arrangement shown in FIG. 1 in the magnetic field Ha by means of the probe So with a frequency of 427,663 Hz.

Curve g: rear cuvette as in the case of curve f while the front cuvette contains the same original "virgin" solution after receiving energy information at 16,180 Hz.

Curve h: rear cuvette as in the case of curves e and g, while the front contains the original "virgin" solution after receiving energy information at 1655 Hz.

In all the measuring operations represented in FIG. 3, operation was with the magnetic field Ha.

The recording speed of the recorder was 60 nm/min.; the ordinate range was plus 0.05 to minus 0.05; the recorded wavelength range extended from 190 nm to 900 nm (the upper limit is always 190 nm) and the scale division of the abscissa was 20 nm/cm.

All the tests involved using two permanent magnets from Thyssen Edelstahlwerke AG type designation 77.121-108467-oo.4 of oxide 300K, the spacing between the mutually oppositely disposed faces of the permanent magnets being for example, 25 cm.

As a further use of the substrate according to the invention, gene modification is possible by transfer of orientation structures imparted to the substrates.

In the treatment of the substrate according to the invention, the magnetic field Ha or Hb is believed to form an intercessor-like requirement for reception of the information energy by the substrate. In a similar manner further information energy may also be imparted to a substrate which is already provided with information energy, whereby the information energy or an active force which is made up of the two forms of information in interfering or also resonant relationship is produced in the substrate. Instead of a probe So, it is also possible to use a substrate which is already provided with information.

A substrate once provided by the process of the invention with information energy or an active force is capable of further transmitting its information to other matter in its area of influence, in particular in any other magnetic field such as, for example, the earth's magnetic field, while the respective strength of the magnetic field may have an influence on the intensity of the transfer effect.

Figure 4:
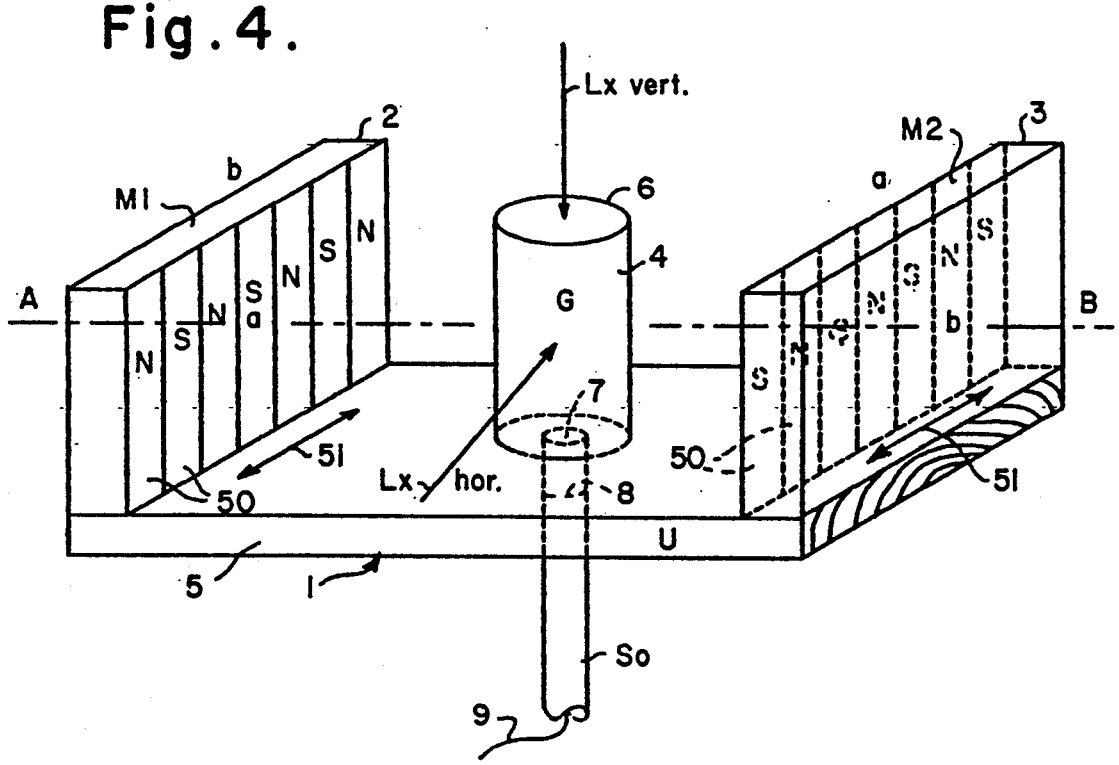
FIG. 4 is a modification of the arrangement of FIG. 1 wherein the permanent magnets are subdivided into individual striplike magnets with alternating North-South poles.

FIG. 4 shows an arrangement similar to FIG. 1 in which the permanent magnets M1 and M2 are subdivided into individual striplike magnets with an alternating North-South pole arrangement. In the embodiment shown, each individual magnet strip 50 is also opposed by the alternative pole. By the use of a parallel swinging effect (see arrows 51), such polarity arrangement can be easily changed, for example, by arranging the same poles facing each other. Such a sidewise, offset, swinging, pole-changing arrangement can be performed even with high frequencies.

The arrows Lx vert(ical) and Lx hor(izontal) demonstrate the penetration direction of a laser beam as the carrier of the information.

Figure 5:
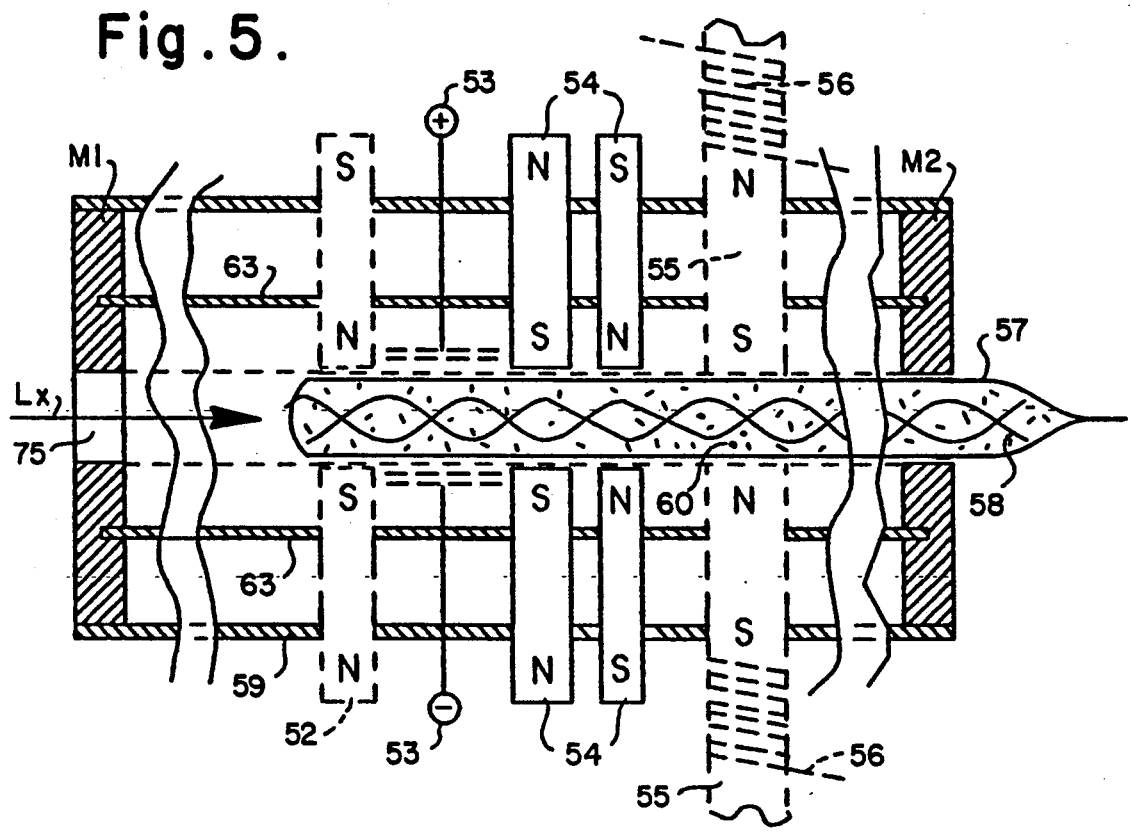
FIG. 5 is a schematic cross-sectional view of an alternative embodiment of an apparatus according to the invention.
Figure 6:
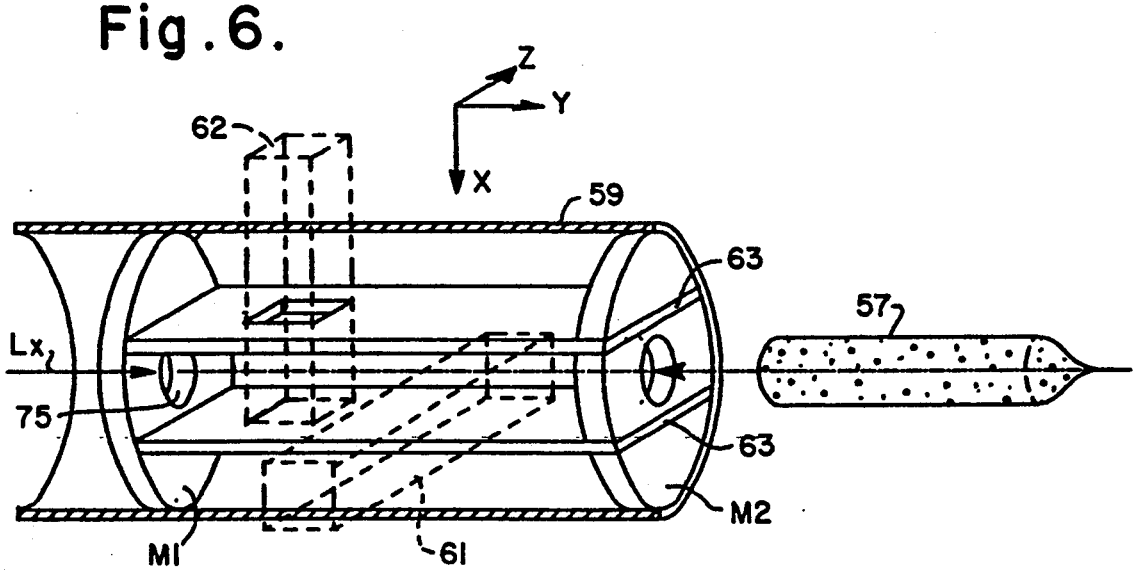
FIG. 6 is a cross-sectional perspective view of an alternative embodiment of an apparatus according to the invention.

FIGS. 5 and 6 show two different devices allowing a combination of different arrangements of the exciting or energizing energy field.

Between two permanent magnets M1 and M2 inside the part between the broken end portions, there are a pair of magnets 52 and/or a pair of electrostatic electrodes 53 and another double pair 54 of permanent magnets with different size and different South-North pole arrangements and/or an electromagnetic device 55 with magnetizing coils 56. All these fields, which can be applied in many variations within the housing 59 around the cuvette 57 linked with the substrate (normal saline), influence the wave and frequency acception (or reception) of the information introduced by the laser beam Lx.

FIG. 6 shows a simpler device having two endwise arranged magnets M1 and M2 and additional electrostatic field planes 63 and different possibilities to arrange the cuvettes 61 and 62 in the room axis x-y-z. Instead, an ampoule-like cuvette can be arranged right in the center axis into which the information loading laser beam is directed. The housing 69 according to FIGS. 5 and 6 can be slipped on a laser beam head by the opening 75.

Figure 7:
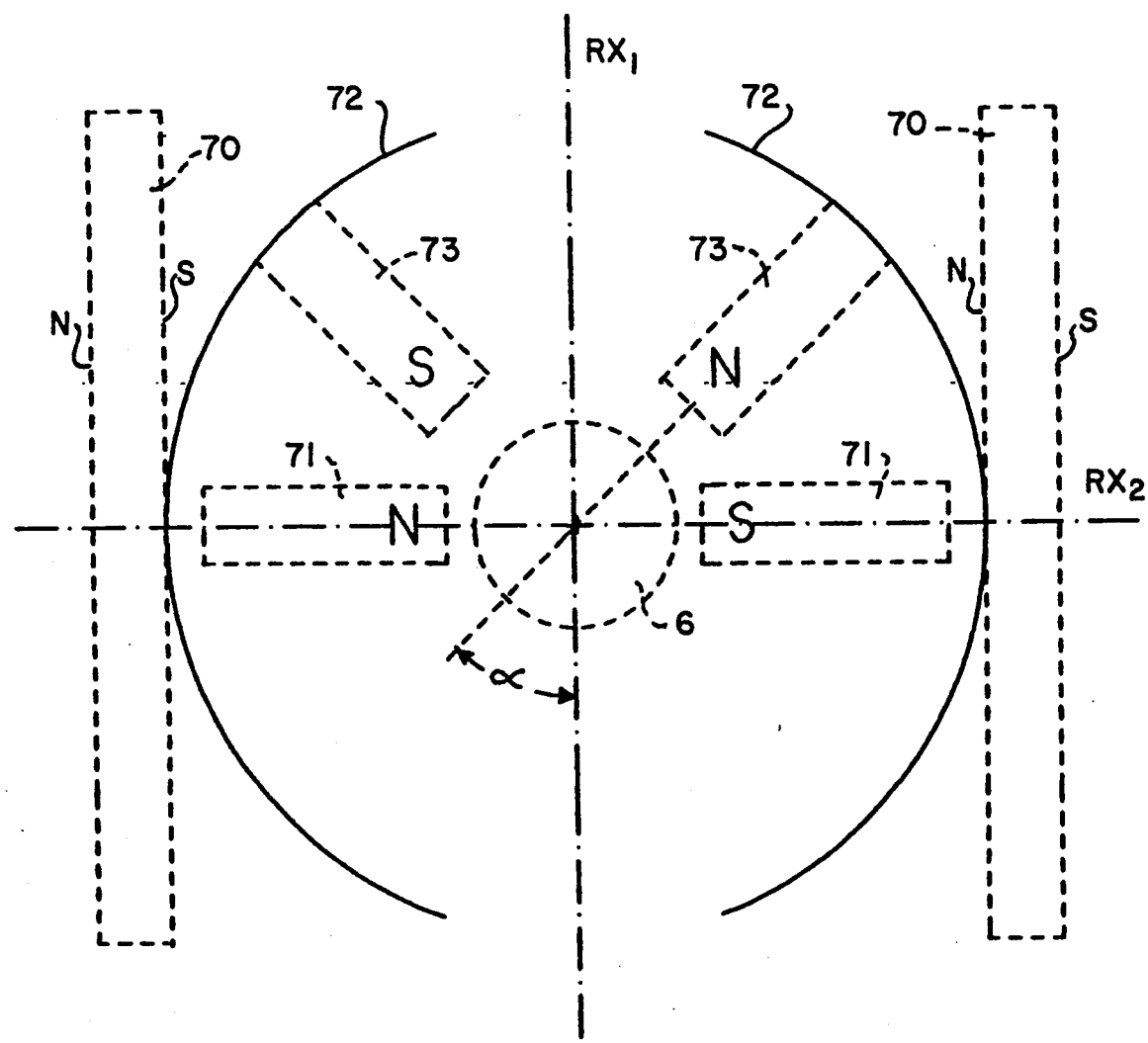
FIG. 7 is a schematic view of an embodiment of the apparatus of FIG. 5 or 6 wherein the magnetic field can be rotated.

Finally, FIG. 7 schematically demonstrates a number of variations in using rotation for the performance of dynamic or moving fields of the magnets or electrostatic electrodes shown in FIGS. 5 and 6.

As a first possibility the pair of magnets 70 can rotate around the vertical rotation axis R x 1 or they alternatively can rotate in counter direction to each other around the horizontal axis R x 2.

The magnet 71 can as another embodiment, rotate around the axis R x 1 around the probe G being arranged in the center of rotation.

Also, supports 72 can be equipped with permanent magnets 73 and can rotate around the axis R x 1 influencing the substrate or probe G in the center of rotation in a distinct, but different angle. Generally, a number of such magnets 73 can be provided all inside the one or two supports 72 being directed with their field centrally to the probe. Finally, the supports can rotate in counter directions. The distance of the field energizing means to the probe is another parameter of effect but generally within the originally disclosed distance up to, for example, 25 cm.

The embodiments of the apparatus of the present invention shown in FIGS. 4, 5 and 6 permit a greater degree of variation in the kind of electrical energy fields applied to the substrate. The substrate may be a probe of normal saline in a cuvette or probe vessel. The alternative embodiments also permit the use of modulized laser energy for applying the information energy to the substrate being prepared for incorporation of the information based on oscillation, mixtures of oscillations of different frequency, shape and amplitude and modulations thereof by means of a magnetic field.

EXAMPLE NO. 1

A female patient who has suffered since 1975 from chronic colitis was treated as follows:

Ampoules (2 ml) containing 0.9% saline solution were placed between two magnets (2, 3) according to the arrangement shown in FIG. 1 in which arrangement, the north pole of magnet 2 faced the south pole of the magnet 3. The substrate 4 and its ampoule vessel were placed between the magnets 2, 3. The distance between the magnets was 25 cm.

The substrate in the ampoule was energized within this permanent magnetic field through a ferrit-coil as antenna (7) with the following frequencies: 16,330 Hz, 16,803 Hz, 17,110 Hz, 18,080 Hz, 17,820 HZ, 17,650 Hz, 7290 Hz, 15,065 Hz, 17,290–95 and 12,521–23 Hz each for 1 second in the maximum.

The energized 0.9% saline solution was used to treat the patient by intramuscular injections of one ampoule every third day for a period of forty-five days.

After that treatment, the "intestinal flora" was normalized.

For additional activation of the body-immune system, in the same magnetic field, the ampoules containing 0.9% saline solution were subsequently contacted each for 2 to 4 seconds with Rosemary, quarz-crystal and vitamin-C.

The patient took one ampoule every third day in one glass of water. After this additional treatment through 20 ampoules the patient's symptoms have not recurred and her diet is not restricted in any way.

A modified process for implying the combination of frequencies with the same effect could be used by the treatment of a 0.9% saline solution within a stripwise changing magnetic field according to the arrangement shown in FIG. 4 whereby a south-pole of the one magnet is facing a north-pole of the opposite permanet magnet. (see, for example 1a).

A further modification which proved to be sucessful, employs the magnets 52 in the arrangement shown in FIG. 5. The same frequencies were applied to the 0.9% saline solution 58 in ampoule 57, through the axis Lx as a modulation frequency of a 632.8 nm laser beam.

EXAMPLE NO. 2

A group of patients were treated by intra muscular injection of one ampoule of a 0.9% saline solution substrate, each ampoule of which had been energized for 1 second in maximum by the following frequencies: 7720 Hz, 7775 Hz, 138,737 Hz and 73,311 Hz.

The frequencies were energized via 632.8 nm laser modulation in the apparatus according to the arrangement shown in FIG. 6 using permanent magnet-pairs 52. Additionally, the ampoules were contacted with thyme and white rock-crystal each for 2 to 4 seconds. One ampoule of the substrate was applied every 5 hours on the first day. On the 2nd and 3rd days, only one ampoule a day was given. Some patients felt better and their symptoms improved after 24 hours. Others felt better and their symptoms improved after 2 days.

The apparatus shown in FIG. 6 can also be used for modulating a 632.8 nm laser beam by already energized substrates in the cuvettes 57, 61/62 whereby the modulated laser beam is directed along the axis Lx on specific accupuncure or diacra points of a human body absorbing the energized frequency combination transferred from the substrate. The cuvettes 61, 62 and 57 are alternatively, the pair 61/62 however as well in combination.

The substrate produced by the process of the present invention can be used for a variety of purposes. The specific examples provided herein demonstrate the best mode of use for the substrate to date. Other uses include as fertilizers and irrigation enhancements in agriculture, in the treatment and modification of human and animal semen, and as interference energy for the purpose of influencing and neutralizing biological systems and microorganisms within such biological systems. Tests are currently being conducted to evaluate the use of the substrate produced by the process of the present invention in the treatment of aquired immune deficiency syndrome.

What is claimed is:

1. A process for the manufacture of a synthetic homeopathic substrate for use in treating biological systems comprising the steps of:
   placing a substrate between opposing sets of magnets, said opposing sets of magnets having a connection axis and defining therebetween a magnetic field having magnetic field axes wherein said magnetic field axes are oriented toward one another in the longitudinal direction;
   feeding information energy from a first energy field to said substrate along a path transverse to said connection axis of said opposing sets of magnets; and
   oscillating said information energy from said first energy source as it is fed to said substrate wherein said information energy is impressed on said substrate altering the absorption properties of said substrate such that said substrate will thereafter impart said information energy to a biological system upon transfer of said substrate to said biological system.

2. A process according to claim 1 wherein at least the opposite poles of said magnets are flat.

3. A process according to claim 1 wherein said magnets are permanent magnets.

4. A process according to claim 1 wherein said magnets are electromagnets.

5. A process according to claim 1 further comprising aligning said connection axis of said opposing sets of magnets in the direction of the earth's magnetic field.

6. A process according to claim 1 wherein said substrate is subjected to a treatment of information energy in the frequency range of an amount up to about twelve KHz.

7. A process according to claim 6 wherein said range is from about three Hz to about twelve KHz.

8. A process according to claim 1 further comprising feeding information energy from a second energy field to said substrate.

9. A process according to claim 8 wherein said first energy field is electromagnetic and said second energy field is electrostatic.

10. A process according to claim 1 wherein information energy is applied to said substrate by means of a laser beam.

11. A process according to claim 1 wherein said substrate is a 0.9% saline solution and further comprising administering effective amounts of said information energy-fed-substrate to a human intramuscularly to substantially reduce the symptoms of colitis.

12. A process according to claim 1 further comprising maintaining said substrate in the first energy field while electromagnetic energy is continuously fed to said substrate, and simultaneously measuring in a specified wavelength range, the current absorption changes by means of a photospectrometer, and recording and storing the values so measured by a computer.

13. A process according to claim 1 wherein each said set of magnets has one magnet, said one magnet having a polarity opposite that of the opposing magnet in said opposing set of magnets.

14. A process according to claim 1 wherein each said set of magnets has a plurality of magnets in a side by side adjacent relationship and each such magnet within one said set of magnets has a polarity opposite that of the magnets immediately adjacent thereto.

15. A process according to claim 14 wherein each magnet within one said set of magnets has a polarity opposite that of the opposing magnet within said opposing set of magnets.

16. A process according to claim 14 wherein each magnet within one said set of magnets has a polarity the same as that of the opposing magnet within said opposing set of magnets.

17. A process according to claim 1 further comprising moving said magnetic field relative to said substrate.

18. A process according to claim 17 wherein said step of moving said magnetic field comprises rotating said opposing sets of magnets about said substrate.

19. A process according to claim 18 wherein said opposing sets of magnet are rotated in a counter direction to each other.

20. A process according to claim 1 further comprising placing additional sets of magnets about said substrate within said magnetic field defined by said opposing sets of magnets, said additional sets of magnets having magnetic axes directed centrally to said first energy field.

21. A process according to claim 1 further comprising rotating said additional sets of magnets about said substrate.

* * * * *

UNITED STATES PATENT AND TRADEMARK OFFICE
CERTIFICATE OF CORRECTION

PATENT NO. : 5,012,110
DATED : April 30, 1991
INVENTOR(S) : Konrad E. W. Kropp

It is certified that error appears in the above-identified patent and that said Letters Patent is hereby corrected as shown below:

Col. 2, line 44, delete "serveral" and substitute -- several -- therefor.

Col 2, line 48, delete "synthezised" and substitute -- synthesized -- therefor.

Col. 8, line 45, delete "17,820 HZ" and substitute -- 17,820 Hz -- therefore.

Col. 10, line 58, delete "magnet" and substitute -- magnets -- therefor.

Signed and Sealed this

Twenty-fourth Day of November, 1992

Attest:

DOUGLAS B. COMER

*Attesting Officer*     Acting Commissioner of Patents and Trademarks